(12) United States Patent
Genc

(10) Patent No.: US 6,682,844 B2
(45) Date of Patent: Jan. 27, 2004

(54) RELEASE VALVE AND METHOD FOR VENTING A SYSTEM

(75) Inventor: Suat Genc, Troy, NY (US)

(73) Assignee: Plug Power Inc., Latham, NY (US)

( * ) Notice: Subject to any disclaimer, the term of this patent is extended or adjusted under 35 U.S.C. 154(b) by 297 days.

(21) Appl. No.: 09/844,560

(22) Filed: Apr. 27, 2001

(65) Prior Publication Data

US 2002/0160245 A1 Oct. 31, 2002

(51) Int. Cl.[7] .......................... H01M 2/00; H01M 2/02; H01M 8/04; H01M 8/12; H01M 2/14
(52) U.S. Cl. .............................. 429/34; 429/25; 429/38
(58) Field of Search ........................ 429/12, 13, 22, 429/25, 34, 38, 39; 222/3, 5, 6, 83, 84, 85

(56) References Cited

U.S. PATENT DOCUMENTS

| | | | | |
|---|---|---|---|---|
| 4,923,767 A | * | 5/1990 | Grasso et al. ................. | 429/12 |
| 5,303,732 A | * | 4/1994 | Jonsson ....................... | 137/318 |
| 5,499,648 A | * | 3/1996 | Powell et al. ............ | 137/15.24 |
| 5,772,935 A | * | 6/1998 | Zhadanovsky ............... | 264/48 |
| 5,795,674 A | * | 8/1998 | Shiota ......................... | 429/54 |
| 6,309,521 B1 | * | 10/2001 | Andrews et al. ............ | 204/252 |
| 6,423,434 B1 | * | 7/2002 | Pratt et al. ..................... | 429/13 |
| 6,466,681 B1 | * | 10/2002 | Siska et al. ................. | 381/372 |
| 6,502,421 B2 | * | 1/2003 | Kotliar ........................ | 62/640 |

OTHER PUBLICATIONS

Versapor R specification brochure, PALL Speciality Materials, 1998, two pages.
Emflon PTFE specification brochure, PALL Speciality Materials, 1998, two pages.

* cited by examiner

Primary Examiner—Bruce F. Bell
Assistant Examiner—Donald V. Scaltrito
(74) Attorney, Agent, or Firm—Heslin Rothenberg Farley & Mesiti P.C.

(57) ABSTRACT

A release valve is disclosed which in one embodiment includes a housing having a passageway extending therethrough and defining an inlet and an outlet, and a membrane extending across the passageway between the inlet and the outlet. The membrane is operable to permit passage through the passageway of gas at a first pressure, inhibit passage through the passageway of liquid at the first pressure, and permit passage of liquid at a second pressure greater than the first pressure. The release valve may also include a check valve for inhibiting passage of gas from the outlet to the inlet. The release valve is suitably employed in fuel cell systems such as in a cooling system thereof.

57 Claims, 4 Drawing Sheets

US 6,682,844 B2

RELEASE VALVE AND METHOD FOR VENTING A SYSTEM

FIELD OF THE INVENTION

The present invention relates generally to release valves, and more particularly to release valves and methods for venting cooling systems.

BACKGROUND OF THE INVENTION

Fuel cells electrochemically convert reactants, for example, a fuel and an oxidant, to electricity. Unlike batteries, which typically contain a set amount of chemicals for generating electricity and which stop delivering electricity once the chemicals are consumed, fuel cells can deliver electricity continuously as long as the fuel cells receive a fuel and an oxidant.

A Proton Exchange Membrane (hereinafter "PEM") fuel cell converts the chemical energy of reactants such as hydrogen and oxidants such as air/oxygen directly into electrical energy. The PEM is a solid polymer electrolyte that permits the passage of protons (i.e., H+ions) from the "anode" side of a fuel cell to the "cathode" side of the fuel cell while preventing passage therethrough of the reactants (e.g., hydrogen and air/oxygen).

Fuel cell systems typically include one or more closed loop cooling systems through which a coolant liquid circulates for removing heat from the fuel cell via a heat exchanger. A problem with such cooling systems is the accumulation of gas in the cooling system which adversely affects the coolant circulation and the proper functioning of heat exchangers. Gases, mainly air, can be drawn into the cooling system from the outside or from a fuel cell cabinet (main enclosure around the fuel cell) due to local negative pressures during normal operation or during a coolant drain process when the system is temporarily shut down. In order to ensure proper and efficient operation, gas contained in the cooling system during startup and during normal operation needs to be removed. One method for removing gas contained in the cooling system is to use a bleed valve.

There is a need for further improvements in venting gas from fuel cell cooling systems.

SUMMARY OF THE INVENTION

The present invention provides, in a first aspect, a release valve having a housing comprising a passageway extending therethrough and defining an inlet and an outlet, and a membrane extending across the passageway between the inlet and the outlet. The membrane is operable to permit passage through the passageway of gas at a first pressure, inhibit passage through the passageway of liquid at the first pressure, and permit passage of liquid at a second pressure greater than the first pressure.

The present invention provides, in a second aspect, a portion of a system through which a fluid is flowable in which the portion of the system includes a conduit having an outer surface and an inner surface defining a passageway through which the fluid is flowable and an opening extending through the conduit from the outer surface to the inner surface. A membrane extends across the opening and the membrane is operable to permit passage through the passageway of gas at a first pressure, inhibit passage through the passageway of liquid at the first pressure, and permit passage of liquid at a second pressure greater than the first pressure.

The present invention provides, in a third aspect, a cooling system through which a coolant is flowable. The cooling system includes a conduit, and a release valve having a housing comprising a passageway extending therethrough and defining an inlet and an outlet. The outlet is operably connected to the conduit and in communication with the coolant. A membrane extends across the passageway between the inlet and the outlet. The membrane is operable to permit passage through the passageway of gas at a first pressure, inhibit passage through the passageway of liquid at the first pressure, and permit passage of liquid at a second pressure greater than the first pressure.

The present invention provides, in a fourth aspect, a fuel cell system having a fuel cell, a cooling system for cooling the fuel cell, and a releases valve or portion of the cooling system, as described above, operably connected to the cooling system.

The present invention provides, in a fifth aspect, a method for venting a system through which a fluid is flowable. The method includes providing a membrane across an opening to the system. The membrane is operable to permit passage of gas at a first pressure and inhibit passage of liquid at the first pressure.

The present invention provides, in a sixth aspect, a method for relieving a predetermined pressure in a system through which a gas and a liquid are flowable. The method includes selecting a membrane operable to permit passage of gas at a first pressure, inhibit passage of liquid at the first pressure, and permit passage of liquid at the predetermined pressure. The membrane is provided across an opening to the system.

BRIEF DESCRIPTION OF THE DRAWINGS

The subject matter which is regarded as the invention is particularly pointed out and distinctly claimed in the concluding portion of the specification. The invention, however, may best be understood by reference to the following detailed description of several embodiments and the accompanying drawing in which:

DETAILED DESCRIPTION OF THE INVENTION

Figure 1:
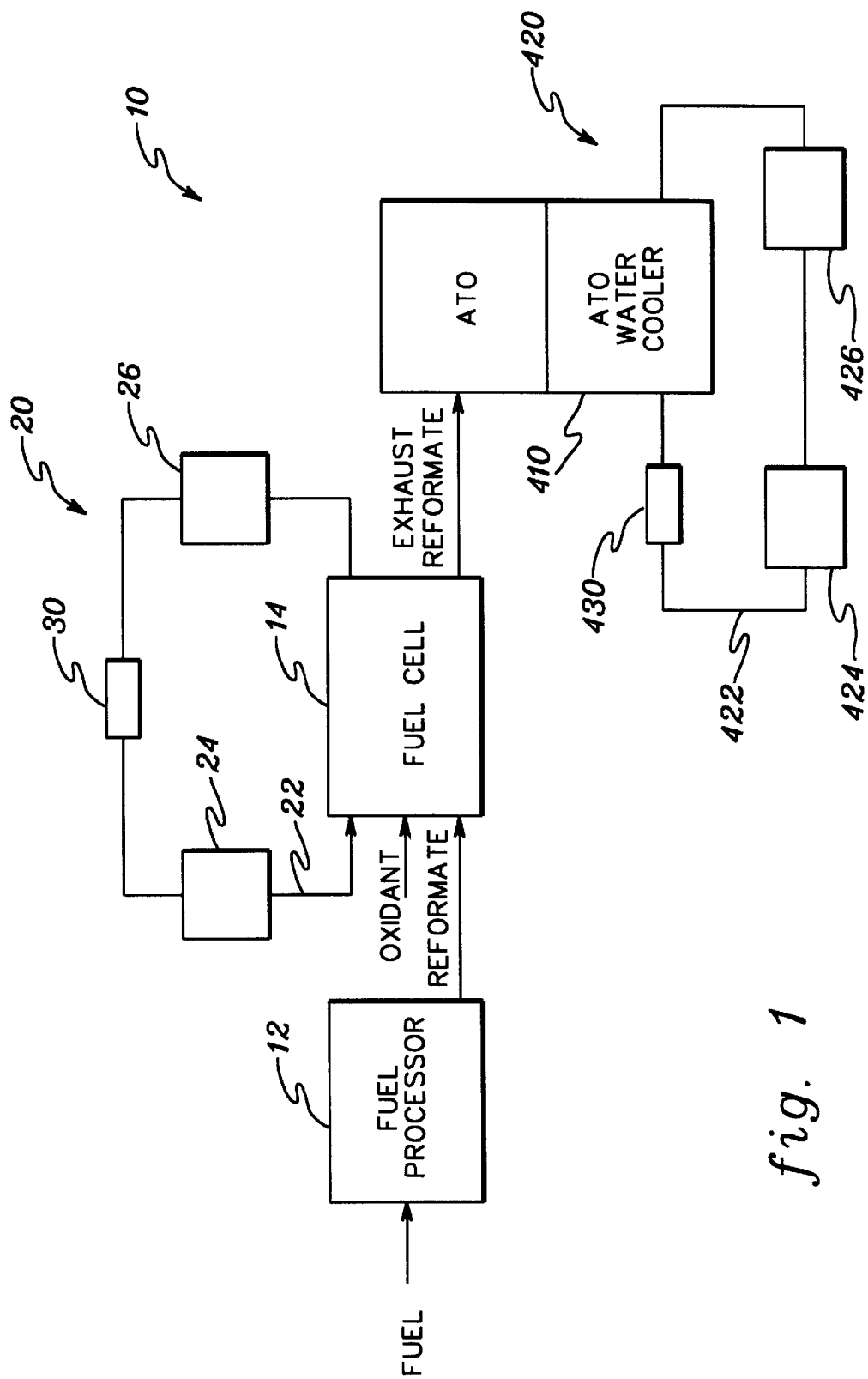
FIG. 1 is a schematic diagram of a fuel cell system having a cooling system according to the present invention.

FIG. 1 illustrates a schematic diagram of one embodiment of a fuel cell system 10 according to the present invention. In this illustrated embodiment, fuel cell system 10 generally includes a fuel processor 12 for reforming a supply of fuel such as methane, propane, and natural gas, and producing a supply of reformate, a fuel cell 14 for receiving the reformate and an oxidant such as oxygen or air to generate electricity, and a cooling system 20. Cooling system 20 includes a cooling loop or conduit 22 operably connected to fuel cell 14, a heat exchanger 24, a pump 26, and a release valve 30. A coolant such as a liquid (e.g., THERMINOL heat transfer fluid available from Solutia, Inc., glycol, dionized water or other cooling materials known in the art) is typically circulated through the cooling system. As described in greater detail below, the release valve provides an effective technique of venting of gas while retaining the coolant liquid in the coolant system.

Figure 2:
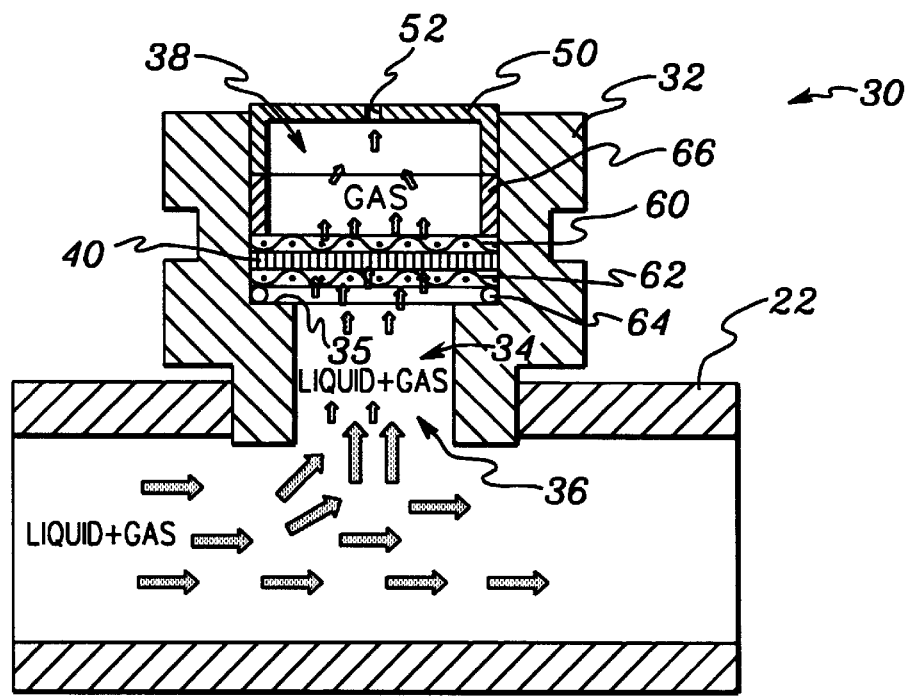
FIG. 2 is an enlarged cross-sectional view of one embodiment of the release valve shown in FIG. 1.

FIG. 2 is an enlarged view of release valve 30. In this illustrated embodiment release valve 30 includes a housing 32 having a passageway 34 extending therethrough which defines a lower inlet 36 and an upper outlet 38. The lower end of housing 32 is operably connected to conduit 22 so that gas and/or liquid in the coolant may travel into inlet 36. A membrane 40 extends across passageway 34 between inlet 36 and outlet 38. Membrane 40 is desirably operable to permit passage through passageway 34 of gas at a first pressure and inhibit passage through passageway 34 of liquid at the first pressure.

For example, the membrane may a microporous membrane such as a VERSAPOR R membrane from Pall Specialty Materials of Port Washington, New York, a division of Pall Corporation. A VERSAPOR R membrane is a FluoRepel treated membrane offering oleophobic/hydrophobic properties. The VERSAPOR R membrane is also a modified acrylic copolymer cast on a non-woven nylon support, and has a pore size between about 0.2 micrometers and about 10.0 micrometers. Such a membrane allows passage of gas at low pressure differences (compared to ambient pressures) while inhibiting passage of liquid, e.g., the membrane is gas permeable and substantially liquid impermeable. The membrane may also be a microporous membrane such as an EMFLON PTFE membrane also from Pall Specialty Materials of Port Washington, New York, a division of Pall Corporation.

With reference still to FIG. 2, release valve 30 may also include a cap 50 which extends across outlet 38. Cap 50 may have an aperture 52 disposed in the center thereof for allowing the release of gas after the gas has passed through membrane 40.

Housing 32 of release valve 30 may also define passageway 34 having a first cross-section and a second different cross-section thereby defining an annular ledge or stop 35 therebetween. In this illustrated embodiment, release valve 30 may include membrane 40 sandwiched between a first perforated member 60 and a second perforated member 62. Perforated members 60 and 62 may be thin sheets of metal or plastic having a plurality of apertures such as holes. Alternatively, the perforated members may include metal or plastic screens or meshes.

The sandwiched perforated members and membrane may be positioned on an O-ring 64 supported on stop 35, and a sleeve 66 may be disposed on top of the sandwiched perforated members and the membrane may be held in place with cap 50 thereby sealing the membrane along the edge thereof to passageway 34.

Figure 3:
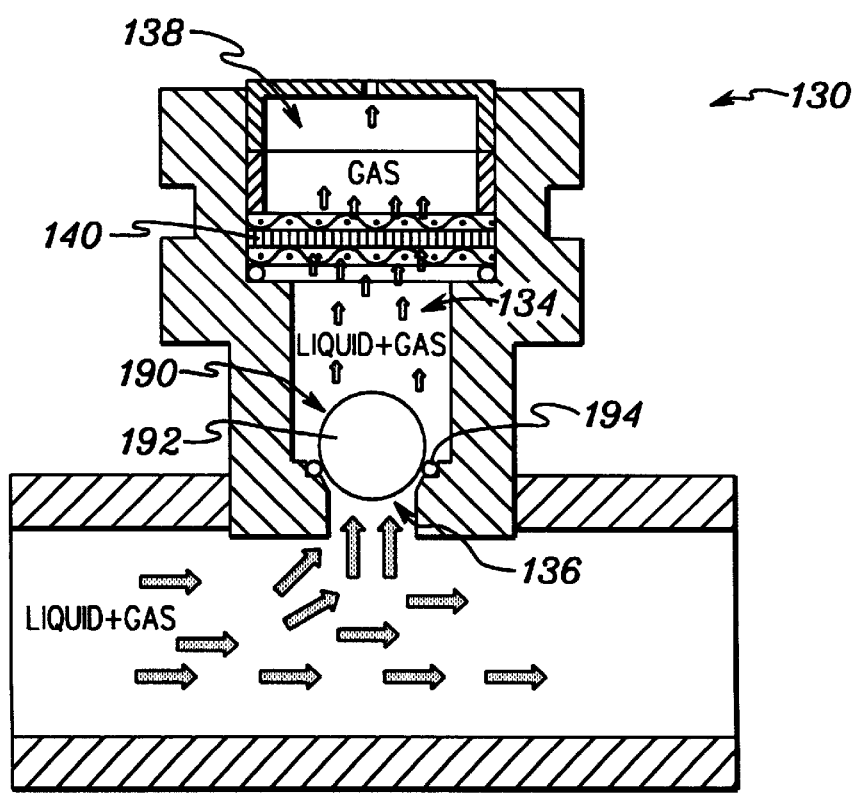
FIG. 3 is a cross-sectional view of another embodiment of a release valve.

FIG. 3 illustrates another embodiment of a release valve 130 according to the present invention having a membrane 140 which is operable to permit passage through a passageway 134 of gas at a first pressure and inhibit passage through passageway 134 of liquid at the first pressure. In this illustrated embodiment, release valve 130 includes a check valve 190 for inhibiting passage of gas from an upper outlet 138 to a lower inlet 136 of passageway 134. Check valve 190 may include a ball 192 supported on an O-ring 194 supported across inlet 136. Incorporation of a check valve in the release valve may allow a reduction in the packaged size of the release valve. It will be appreciated that other types of check valves may be employed to inhibit passage of gas from the outlet to the inlet of the passageway (e.g., spring biased check valves).

With reference to FIG. 1 again, the fuel cell may include a fuel cell stack having a plurality of individual fuel cells. The fuel cell may include a solid polymer membrane or PEM (proton exchange membrane) such as a NAFION material manufactured by E.I. Du Pont de Nemours Company. The membrane may be sandwiched between catalysts, gas diffusion layers and a pair of fluid flow plates as is known in the art. The fluid flow plates may be provided with fluid flow channels for servicing reactants such as hydrogen or reformate to one side of the PEM and air or oxygen to the other side of the PEM. Where the fuel cell includes a plurality of fuel cells forming a fuel cell stack, end plates may be provided for compressing the plurality of fuel cells. Manifolds may be provided in the fuel cell plates for servicing the reactants to the fluid flow channels of the fluid flow plates. By connecting an external load (not shown) between electrical contacts (not shown) of current collector/conductor plates (not shown), one can complete a circuit for use of current generated by the one or more PEM-type fuel cells. A PEM-type fuel cell stack may be cooled to operate at a temperature between about 20 degrees Celsius (C), i.e., ambient, and about 110 degrees C, and preferably around 65 degrees C +/−10 degrees C. It would be appreciated that other systems may operate at higher or lower temperatures.

Figure 4:
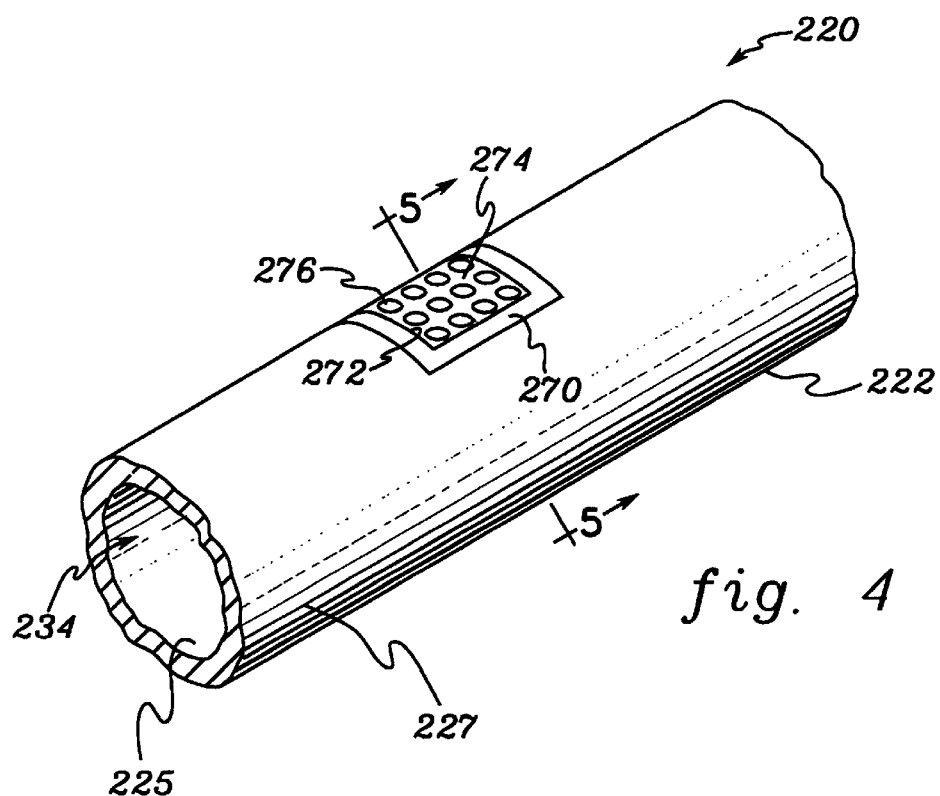
FIG. 4 is perspective view of a portion of a cooling system according to the present invention.
Figure 5:
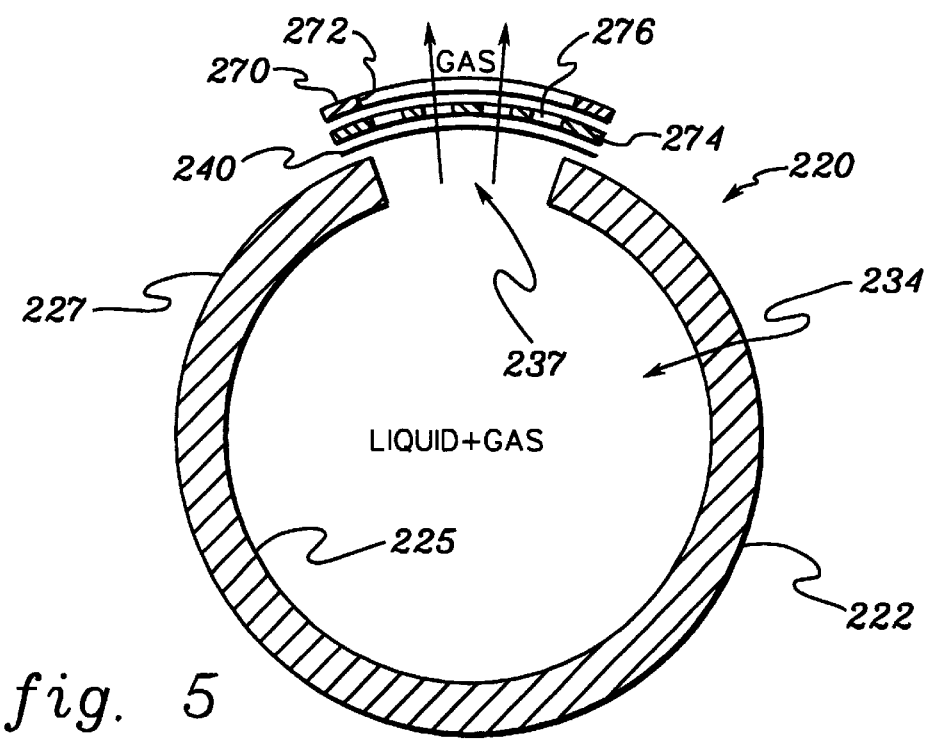
FIG. 5 is an exploded cross-sectional view taken along line 5—5 of FIG. 4.

FIGS. 4 and 5 illustrate a portion of a cooling system 220 comprising a conduit 222 having an inner surface 225 defining a passageway 234 through which the coolant is flowable. Conduit 222 also includes an opening 237 (FIG. 5) extending through conduit 222 from inner surface 225 to an outer surface 227. A membrane 240 (FIG. 5), such as described above, extends across opening 237 (FIG. 5) and is operable to permit passage through passageway 234 of gas at a first pressure and inhibit passage through passageway 234 of liquid at the first pressure.

A frame 270 having an opening 272 therethrough may be used to secure membrane 240 (FIG. 5) to conduit 222, for example, using bolts or screws. In addition, a protective perforated member 274 having a plurality of apertures 276 may be disposed between frame 270 and membrane 240 to protect membrane 240.

In another embodiment, the opening to the conduit may define a flange (e.g., countersunk landing) on which the membrane, perforated member, and frame may be disposed. In such as configuration, the frame may be provided laterally-extending detents for engaging the opening and locking in place the membrane, perforated member, and frame in a snap-fit manner.

Figure 6:
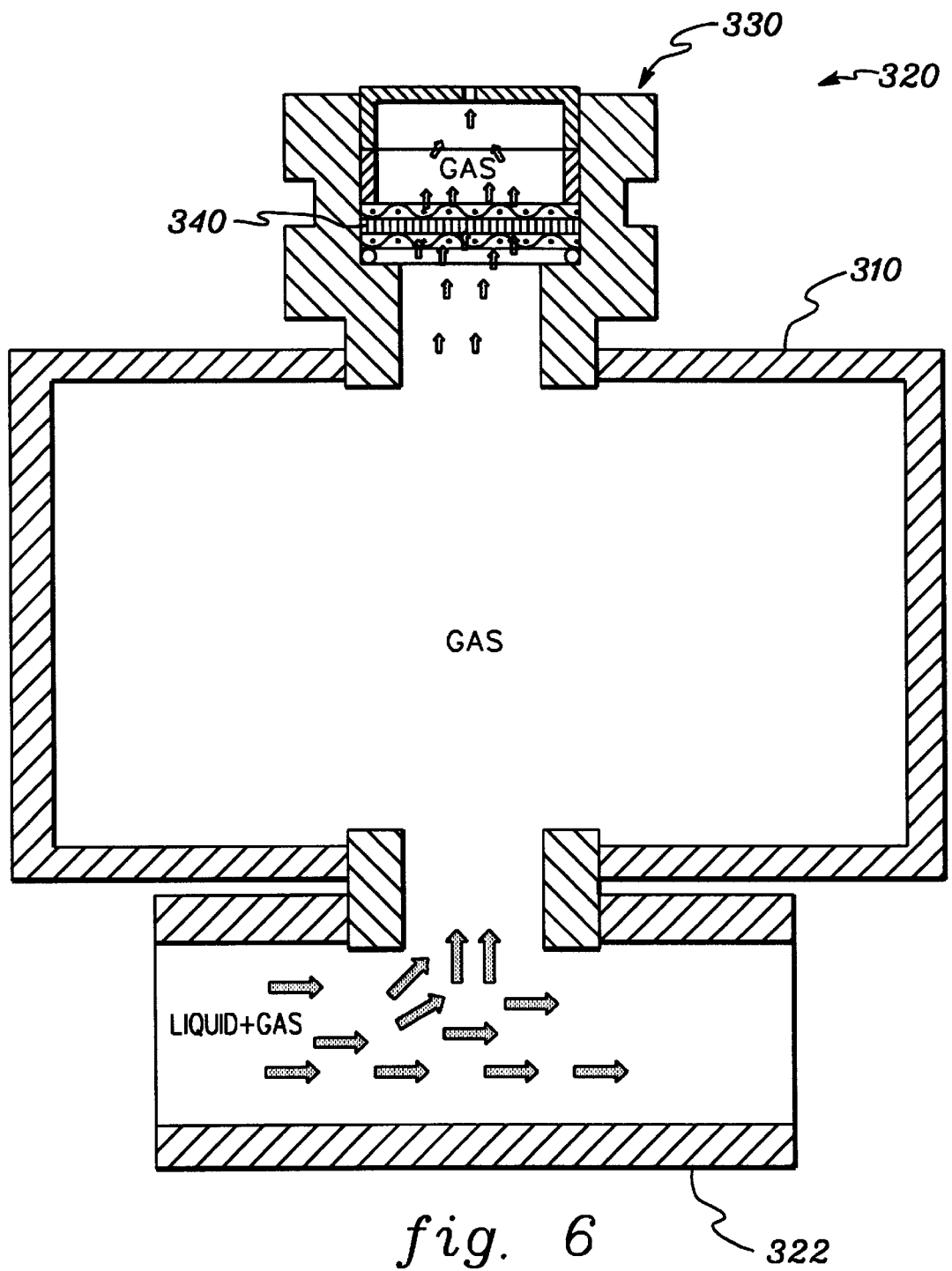
FIG. 6 is another embodiment of a portion of a cooling system according to the present invention.

FIG. 6 illustrates another portion of a cooling system 320 having a container or reservoir 310 disposed between a release valve 330 and a conduit 322. The reservoir receives and stores gas prior to venting of the gas through release valve 330. Such a configuration reduces the likelihood of liquid coming in contact with membrane 340 of release valve 330.

The various release valves of the present invention may be placed at the highest location in the cooling system so that gases can naturally travel upward toward the release valve. The various release valves may also be placed at other locations such as where there is a risk of accumulation or trapping of gas. In coolant systems, there is also typically a positive pressure (compared to ambient) in the cooling system that assists the gas passing through the membrane. The positive pressure in the cooling system may also increase the gas flow rate across the membrane as the pressure increases.

With reference again to FIG. 1, a release valve 430 of the present invention may be used in an anode tail-gas oxidizer (ATO) water cooling system 420 which may include a cooling loop or conduit 422 operably connected to an ATO water cooler 410, a heat exchanger 424 and a pump 426. A coolant such as a liquid (e.g., water-glycol solution) is typically circulated through the cooling system.

A test was conducted to evaluate the performance of a release valve according to the present invention for use in an ATO water cooling system. The cooling system operating conditions were defined as an 80 degrees Celsius (C) coolant temperature and a 5 psi coolant pressure for the system. Purge time at the startup stage was also defined as less than 20 minutes assuming that the cooling system is filled with gas or air at the beginning.

The membrane chosen was a VERSAPOR R membrane and was operable up to 180 degrees C. and having a water intrusion pressure of 10 psi. Airflow rate for the selected membrane size was roughly 1.0 liter per minute at 5 psi pressure.

The test was conducted using water as a liquid and air as a gas. The release valve vented air bubbles generated in the simulator and retained the water. Assuming the air volume in the coolant system when the system was drained was about 4 liters, it was estimated that the total purge time would be about 4 minutes. This is less than the desired system requirements noted above for startup.

In another aspect of the present invention, the release valve may be used as a pressure relief valve, for example, by not only releasing gas but also releasing liquid from the cooling system when the pressure exceeds a certain limit. For example, the membrane in addition to permitting passage of gas at a first pressure and inhibiting passage of liquid at the first pressure, the membrane also permits passage of liquid at a second pressure greater than the first pressure. For this, the membrane is selected having a water intrusion pressure at the maximum allowed pressure of the system. For example, a membrane fabricated from a VERSAPOR R membrane having a pore size of about 0.8 micrometers has a water intrusion pressure of about 8 psi to about 15 psi. Thus, when the pressure exceeds 8 psi the release valve would begin to allow passage of liquid and operate as a pressure relief valve for the cooling system.

While the present invention is described above in connection with closed loop cooling systems for fuel cells, it will be appreciated that the present invention is suitable with open loop cooling systems as well as other closed loop systems and open loop systems where a gas needs to be vented from a liquid. The membrane can be selected to satisfy a particular application requiring certain pressures, temperatures, types of liquids, and gas flow rates. Other closed loop systems in fuel cell systems include radiator coolant systems.

Advantages of the present invention allow designing a compact, low-cost, release valves and pressure relief valves which require little or no control or manual adjustment.

Thus, while various embodiments of the present invention have been illustrated and described, it will be appreciated to those skilled in the art that many changes and modifications may be made thereunto without departing from the spirit and scope of the invention. For example, the various features and elements of the release valve and systems may be combined in various combinations.

What is claimed is:

1. A release valve comprising:
    a housing comprising a passageway extending therethrough and defining an inlet and an outlet;
    a membrane extending across the passageway between said inlet and said outlet, said membrane operable to permit passage through said passageway of gas at a first pressure, inhibit passage through said passageway of liquid at said first pressure, and permit passage of liquid at a second pressure greater than said first pressure; and
    wherein said membrane comprises micropores having a pore size between about 0.2 micrometers and about 10.0 micrometers.

2. The release valve of claim 1 further comprising a check valve for inhibiting passage of gas from said outlet to said inlet.

3. The release valve of claim 2 wherein said check valve comprises a ball.

4. The release valve of claim 1 further comprising a perforated member disposed across a surface of said membrane.

5. The release valve of claim 1 further comprising a first perforated member disposed across a first surface of said membrane and a second perforated member disposed across a second surface of said membrane.

6. The release valve of claim 1 wherein said passageway comprises a first cross-section and a second cross-section defining therebetween a stop upon which rests said membrane.

7. The release valve of claim 6 further comprising an O-ring disposed between said stop and said membrane.

8. The release valve of claim 6 further comprising a sleeve, and wherein said membrane is disposed between said sleeve and said stop.

9. The release valve of claim 1 further comprising a cap extending across said outlet, said cap comprising an aperture extending therethrough.

10. The release valve of claim 1 wherein said membrane comprises a hydrophobic membrane.

11. The release valve of claim 1 wherein said membrane comprises micropores having a pore size of about 0.8 micrometers.

12. A portion of a system through which a fluid is flowable, said portion of the system comprising:
    a conduit having an outer surface and an inner surface defining a passageway through which the fluid is flowable and an opening extending through said conduit from said outer surface to said inner surface;
    a membrane extending across said opening, said membrane operable to permit passage through said opening of gas at a first pressure, inhibit passage through said opening of liquid at said first pressure, and permit passage of liquid through said opening at a second pressure greater than said first pressure; and
    wherein said membrane comprises micropores having a pore size between about 0.2 micrometers and about 10.0 micrometers.

13. The portion of the system of claim 12 further comprising a frame having an aperture therethrough, and wherein said membrane is sandwiched between said frame and said conduit.

14. The portion of the system of claim 12 further comprising a generally perforated member disposed across said opening, and wherein said membrane is sandwiched between said perforated member and said conduit.

15. The portion of the system of claim 12 wherein said membrane comprises a hydrophobic membrane.

16. The portion of the system of claim 12 wherein said membrane comprises micropores having a pore of about 0.8 micrometers.

17. A cooling system through which a coolant is flowable, said cooling system comprising:

a conduit through which the coolant is flowable; and a release valve comprising:
- a housing comprising a passageway extending therethrough and defining an inlet and an outlet, said outlet operably connected to said conduit and in communication with the coolant;
- a membrane extending across the passageway between said inlet and said outlet, said membrane operable to permit passage through said passageway of gas at a first pressure, inhibit passage through said passageway of liquid at said first pressure, and permit passage of liquid at a second pressure greater than said first pressure; and
- wherein said release valve is disposed at the highest elevation of said cooling system.

18. The cooling system of claim 17 wherein said membrane comprises micropores having a pore size of about 0.8 micrometers.

19. The cooling system of claim 17 wherein said cooling system comprises a closed loop cooling system.

20. The cooling system of claim 17 wherein said cooling system comprises an open loop cooling system.

21. The cooling system of claim 17 wherein the release valve further comprises a check valve for inhibiting passage of gas from said outlet to said inlet.

22. The cooling system of claim 21 wherein said check valve comprises a ball.

23. The cooling system of claim 17 further comprising a pump for circulating the coolant.

24. The cooling system of claim 17 wherein said membrane comprises a hydrophobic membrane.

25. The cooling system of claim 17 wherein said membrane comprises micropores having a pore size between about 0.2 micrometers and about 10.0 micrometers.

26. A fuel cell system comprising:
- a fuel cell;
- a cooling system for cooling said fuel cell; and
- a release valve of claim 1 operably connected to said cooling system.

27. The fuel cell system of claim 26 wherein said fuel cell system comprises at least one PEM fuel cell.

28. A fuel cell system comprising:
- a fuel cell;
- a cooling system for cooling said fuel cell; and
- wherein a portion of said cooling system comprises the portion of the system of claim 12.

29. The fuel cell system of claim 28 wherein said fuel cell system comprises at least one PEM fuel cell.

30. A method for venting a system through which a fluid is flowable, the method comprising:
- providing a membrane across an opening to the system, the membrane operable to permit passage of gas at a first pressure and inhibit passage of liquid at the first pressure; and
- wherein the membrane comprises micropores having a pore size between about 0.2 micrometers and about 10.0 micrometers.

31. The method of claim 30 further comprising providing a check valve between the system and the membrane, the check valve operable to inhibit passage of gas through the membrane to the system.

32. The method of claim 30 further comprising positioning the opening at the highest portion of the system.

33. A method for relieving a predetermined pressure in a system through which a gas and a liquid are flowable, the method comprising:

selecting a membrane operable to permit passage of gas at a first pressure and inhibit passage of liquid at the first pressure, and the membrane operable to permit passage of liquid at the predetermined pressure;

providing the membrane across an opening to the system; and positioning the opening at the highest portion of the system.

34. The method of claim 33 further comprising providing a check valve between the system and the membrane, the check valve operable to inhibit passage of gas through the membrane to the system.

35. The method of claim 33 further comprising sizing the membrane to permit a predetermined liquid flow rate at the predetermined pressure.

36. The method of claim 33 wherein the first pressure is less than the predetermined pressure.

37. A release valve comprising:
- a housing comprising a passageway extending therethrough and defining an inlet and an outlet;
- a membrane extending across the passageway between said inlet and said outlet, said membrane operable to permit passage through said passageway of gas at a first pressure, inhibit passage through said passageway of liquid at said first pressure, and permit passage of liquid at a second pressure greater than said first pressure; and
- a first perforated member disposed across a first surface of said membrane and a second perforated member disposed across a second surface of said membrane.

38. A release valve comprising:
- a housing comprising a passageway extending therethrough and defining an inlet and an outlet;
- a membrane extending across the passageway between said inlet and said outlet, said membrane operable to permit passage through said passageway of gas at a first pressure, inhibit passage through said passageway of liquid at said first pressure, and permit passage of liquid at a second pressure greater than said first pressure;
- said passageway comprising a first cross-section and a second cross-section defining therebetween a stop upon which rests said membrane; and
- an O-ring disposed between said stop and said membrane.

39. A release valve comprising:
- a housing comprising a passageway extending therethrough and defining an inlet and an outlet;
- a membrane extending across the passageway between said inlet and said outlet, said membrane operable to permit passage through said passageway of gas at a first pressure, inhibit passage through said passageway of liquid at said first pressure, and permit passage of liquid at a second pressure greater than said first pressure;
- said passageway comprising a first cross-section and a second cross-section defining therebetween a stop upon which rests said membrane; and
- a sleeve, and wherein said membrane is disposed between said sleeve and said stop.

40. A release valve comprising:
- a housing comprising a passageway extending therethrough and defining an inlet and an outlet;
- a membrane extending across the passageway between said inlet and said outlet, said membrane operable to permit passage through said passageway of gas at a first pressure, inhibit passage through said passageway of liquid at said first pressure, and permit passage of liquid at a second pressure greater than said first pressure; and a cap extending across said outlet, said cap comprising an aperture extending therethrough.

41. A portion of a system through which a fluid is flowable, said portion of the system comprising:
a conduit having an outer surface and an inner surface defining a passageway through which the fluid is flowable and an opening extending through said conduit from said outer surface to said inner surface;
a membrane extending across said opening, said membrane operable to permit passage through said opening of gas at a first pressure, inhibit passage through said opening of liquid at said first pressure, and permit passage of liquid through said opening at a second pressure greater than said first pressure; and
a generally perforated member disposed across said opening, and wherein said membrane is sandwiched between said perforated member and said conduit.

42. A cooling system through which a coolant is flowable, said cooling system comprising:
a conduit through which the coolant is flowable; and
a release valve comprising:
a housing comprising a passageway extending therethrough and defining an inlet and an outlet, said outlet operably connected to said conduit and in communication with the coolant;
a membrane extending across the passageway between said inlet and said outlet, said membrane operable to permit passage through said passageway of gas at a first pressure, inhibit passage through said passageway of liquid at said first pressure, and permit passage of liquid at a second pressure greater than said first pressure; and
wherein said membrane comprises micropores having a pore size between about 0.2 micrometers and about 10.0 micrometers.

43. The cooling system of claim 42 wherein said membrane comprises micropores having a pore size of about 0.8 micrometers.

44. A release valve comprising:
a housing comprising a passageway extending therethrough and defining an inlet and an outlet;
a membrane extending across the passageway between said inlet and said outlet, said membrane operable to permit passage through said passageway of gas at a first pressure, inhibit passage through said passageway of liquid at said first pressure, and permit passage of liquid at a second pressure greater than said first pressure; and
a check valve for inhibiting passage of gas from said outlet to said inlet.

45. The release valve of claim 44 wherein said check valve comprises a ball.

46. A portion of a system through which a fluid is flowable, said portion of the system comprising:
a conduit having an outer surface and an inner surface defining a passageway through which the fluid is flowable and an opening extending through said conduit from said outer surface to said inner surface;
a membrane extending across said opening, said membrane operable to permit passage through said opening of gas at a first pressure, inhibit passage through said opening of liquid at said first pressure, and permit passage of liquid through said opening at a second pressure greater than said first pressure; and
a check valve for inhibiting passage of gas into said passageway.

47. The portion of the system of claim 12 wherein said check valve comprises a ball.

48. A cooling system through which a coolant is flowable, said cooling system comprising:
a conduit through which the coolant is flowable; and
a release valve comprising:
a housing comprising a passageway extending therethrough and defining an inlet and an outlet, said outlet operably connected to said conduit and in communication with the coolant;
a membrane extending across the passageway between said inlet and said outlet, said membrane operable to permit passage through said passageway of gas at a first pressure, inhibit passage through said passageway of liquid at said first pressure, and permit passage of liquid at a second pressure greater than said first pressure; and
a check valve for inhibiting passage of gas from said outlet to said inlet.

49. The cooling system of claim 21 wherein said check valve comprises a ball.

50. A fuel cell system comprising:
a fuel cell;
a cooling system for cooling said fuel cell; and
a release valve of claim 44 operably connected to said cooling system.

51. The fuel cell of claim 50 wherein said check valve comprises a ball.

52. A fuel cell system comprising:
a fuel cell;
a cooling system for cooling said fuel cell; and
wherein a portion of said cooling system comprises the portion of the system of claim 46.

53. The fuel cell system of claim 52 wherein said check valve comprises a ball.

54. A method for venting a system through which a fluid is flowable, the method comprising:
providing a membrane across an opening to the system, the membrane operable to permit passage of gas at a first pressure and inhibit passage of liquid at the first pressure; and
providing a check valve to inhibit passage of gas across the opening.

55. The method of claim 54 wherein the check valve comprises a ball.

56. A method for relieving a predetermined pressure in a system through which a gas and a liquid are flowable, the method comprising:
selecting a membrane operable to permit passage of gas at a first pressure and inhibit passage of liquid at the first pressure, and the membrane operable to permit passage of liquid at the predetermined pressure;
providing the membrane across an opening to the system;
selecting a check valve; and
providing the check valve across the opening to inhibit passage of gas across the opening.

57. The method of claim 56 wherein the check valve comprises a ball.

* * * * *